United States Patent
Nishimura

[11] Patent Number: 5,899,434
[45] Date of Patent: May 4, 1999

[54] FLOW RATE CONTROL VALVE

[75] Inventor: Shiro Nishimura, Pompéia, Brazil

[73] Assignee: Maquinas Agricolas Jasto S.A., Pompeia, Brazil

[21] Appl. No.: 08/674,542

[22] Filed: Jul. 2, 1996

[51] Int. Cl.[6] .................................................. F16K 31/12
[52] U.S. Cl. ......................................... 251/30.02; 251/45
[58] Field of Search .................................. 251/30.02, 45

[56] References Cited

U.S. PATENT DOCUMENTS

| | | | |
|---|---|---|---|
| 3,282,556 | 11/1966 | Hancock | 251/45 |
| 3,379,406 | 4/1968 | Greer | 251/45 |

FOREIGN PATENT DOCUMENTS

| | | | |
|---|---|---|---|
| 48412 | 12/1984 | Germany | 251/30.02 |

*Primary Examiner*—A. Michael Chambers
*Attorney, Agent, or Firm*—Michael J. Striker

[57] ABSTRACT

A flow rate control valve has a first housing portion with separated admission and discharge chambers and a first seat, a second housing portion with a main chamber and auxiliary chambers, a valve member movable between a closed position of the valve and abutting against the first seat to interrupt a passage of fluid from the admission chamber to the discharge chamber, and a second position corresponding to an open position of a valve to allow a passage of fluid from the admission chamber to the discharge chamber, a second seat between the auxiliary chamber and the discharge chamber, and a driving element spring-biased against the second seat and activated to withdraw from it and allow passage of fluid between the auxiliary member and the discharge chamber when pressures within the valve are unbalanced and a pressure in the admission chamber forces the valve chamber away from the first seat to open the valve and to allow passage of fluid from the admission chamber to the discharge chamber.

14 Claims, 2 Drawing Sheets

FLOW RATE CONTROL VALVE

BACKGROUND OF THE INVENTION

The present invention relates generally to valves and, more specifically, to a flow rate control valve for use with fluids having suspended particles therein.

Valves for controlling the rate of flow of fluids are well known in the prior art and widely used in a huge variety of technical fields. Typically, a valve includes a housing having an inner passage with a valve seat extending therethrough and a valve member positioned within the passage. The valve member is selectively movable between a first position where the valve member fully contacts the valve seat in the inner passage in order to close the valve and completely interrupt the passage of any fluid, and a second position where the valve member is positioned a distance away from the valve seat in the inner passage in order to open the valve and allow the passage of fluid through said valve. The above description corresponds to a simple embodiment of a flow rate control valve. Several more sophisticated models of these valves are known in the art, including valves with mechanical, hydraulic, electric and/or electronic driving means, or any combination thereof, to control the movement of the valve member to automatically open and close the valve.

A typical use of the flow rate control valves is in the agriculture, to control spraying of agrochemical or agricultural fluids. The flow rate control valves presently known in the art, however, when used to control the spraying of agrochemical or agricultural fluids, have several drawbacks that impair their use. Basically, these drawbacks are related to the fact that the agrochemical and/or agricultural fluids typically include a solution having a considerable number of particles suspended therein, which particles may attach and damage the driving means. As a result, the valves work poorly due to the fact that its driving means operate in a highly contaminated environment, the valve does not closes properly due to the buildup of debris in the valve seat that does not allow for the proper seating of the valve member, or the jamming of the driving means under the attack of the contaminating agents occurs.

SUMMARY OF THE INVENTION

Accordingly, it is an object of the present invention to provide a flow rate control valve particularly designed for use with fluids having suspended particles therein, such as agrochemical or agricultural fluids, which does not have the above discussed drawbacks of the flow rate control valves presently known in the art of A further object of the present invention is to provide such a flow rate control valve particularly designed for use with fluids having suspended particles therein, such as agrochemical or agricultural fluids, having driving means working in an environment substantially free of contaminating agents.

An additional object of the present invention is to provide such a flow rate control valve particularly designed for use with fluids having suspended particles therein, such as agrochemical or agricultural fluids, which does not present operational problems due to the buildup of debris in the valve seat.

Another object of the present invention is to provide such a flow rate control valve particularly designed for use with fluids having suspended particles therein, such as agrochemical or agricultural fluids, having permanently lubricated, freely moving driving means to completely eliminate any possibility of jamming thereof.

It is also an extremely important object of the present invention to provide such a flow rate control valve which can be used for operations with normal low, medium and high pressures utilized in agricultural practices.

In keeping with these objects and with others which will become apparent hereinafter, one feature of the present invention resides, briefly stated, in a flow rate control valve which has a first housing portion having an admission chamber and a discharge chamber separated from one another and a first seat; a second housing portion having a main chamber and an auxiliary chamber communicating with one another; passage means communicating the main chamber with the auxiliary chamber, the main chamber with the admission chamber, and the auxiliary chamber with the discharge chamber; a valve member selectively movable between a first position corresponding to a closed position of the valve and abutting against the first seat to interrupt a passage of fluid from the admission chamber to the discharge chamber, and a second position corresponding to an open position of a valve to allow a passage of fluid from the admission chamber to the discharge chamber, driving means for controlling opening and closing of the valve and including a second seat provided between the auxiliary chamber and the discharge chamber a driving chamber insulated from the auxiliary chamber, and a driving element spring biased against the second seat for balancing pressures within the valve and helping to maintain a closed condition of the valve, the driving element being activated to withdraw from the second seat and allow passage of fluid between the auxiliary chamber and the discharge chamber when the pressures within the valve are unbalanced and a pressure in the admission chamber forces the valve chamber away from the first seat in order to open the valve and to allow a passage of fluid from the admission chamber to the discharge chamber.

More particularly with reference to all the specific elements of the inventive flow rate control valve, the valve is formed so that it has a lower housing portion having an admission chamber, a discharge chamber and a wall member separating the chambers, the upper end of the wall member defining a seat for a valve member; an upper housing portion having a main chamber and an auxiliary chamber communicating with the main chamber through a first connecting passage, a second connecting passage communicating the main chamber with the admission chamber in the lower housing portion, and a third connecting passage communicating the auxiliary chamber with the discharge chamber in the lower housing portion; a valve member selectively movable between a first position where the valve member abuts the valve seat in order to interrupt the passage of fluid from the admission chamber to the discharge chamber, and a second position where the valve member allows the passage of fluid from the admission chamber to the discharge chamber; means to interrupt the communication of fluid between the admission chamber in the lower housing portion of the main chamber in the upper housing portion; and driving means for controlling the opening and closing of the valve, the driving means being mounted in a driving chamber insulated from the auxiliary chamber in the upper housing portion, the driving means comprising a spring biased solenoid having a needle shaped end bearing against a valve set in the upper edge of the third connecting passage, the spring biasing the needle shaped end against the third connecting passage in order to balance the pressures within the valve and to help maintain the closed condition of the valve; whereby when the driving means are activated in order to withdraw the needle shaped end from its seat in the third connecting passage to allow the passage of fluid therethrough the pressures within the valve are unbalanced and the pressure in the admission chamber forces the valve member away from its seat in order to open the valve and to allow the passage of fluid from the admission chamber to the discharge chamber.

When a flow rate control valve is designed in accordance with these features of the present invention, it eliminates the disadvantages of the prior art and achieves the objects specified hereinabove.

The flow rate control valve in accordance with the present invention is especially formed so that it reliably operates under the normal low, medium and high pressures utilized in agricultural practices.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
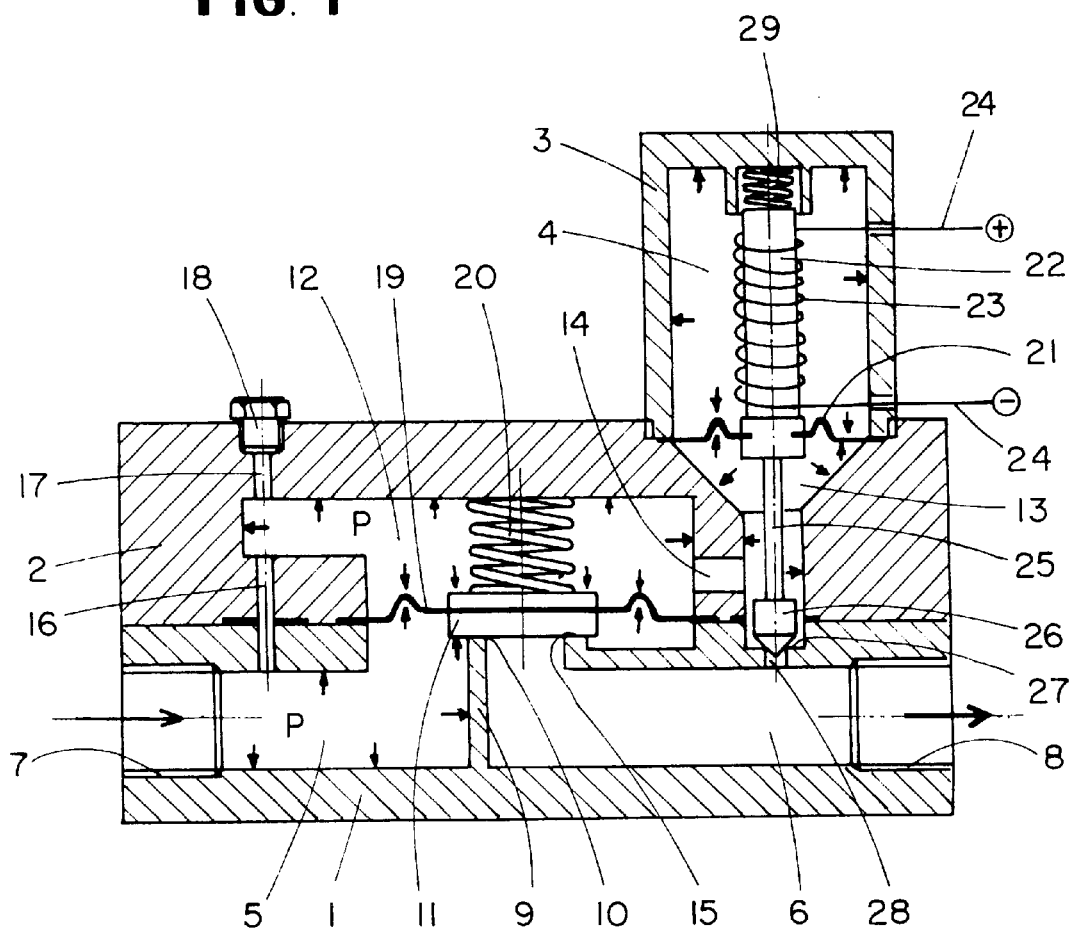
FIG. 1 is an elevational section view of a flow rate control valve according to the present invention, in a closed condition.
Figure 2:
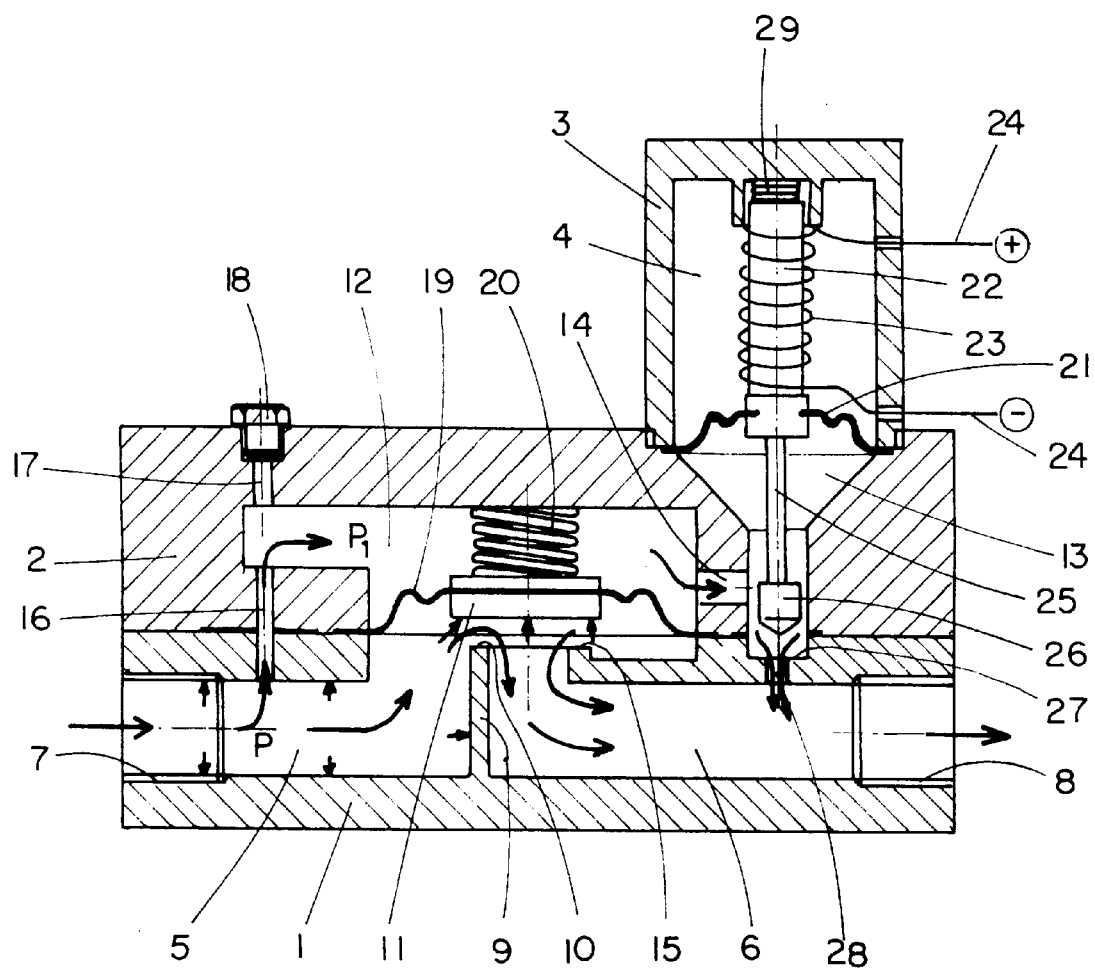
FIG. 2 is an elevational sectional view similar to FIG. 1, showing the valve according to the present invention in an open condition.

A flow rate control valve according to the present invention designed for precisely controlling the rate of flow of a fluid having suspended particles therein, is illustrated in FIG. 1 and has a lower housing portion 1, an upper housing portion superior 2 and a driving chamber 3 having a solenoid 4 mounted therein to control the opening and closing of the valve.

The lower housing portion 1 has an admission chamber 5 and a discharge chamber 6 for the fluid to be controlled, both formed with inner screw portions 7, 8 for connecting with hoses or pipes (not shown). A wall member 9 separates the admission and discharge chambers 5, 6, and the upper end of the wall member defines a seat 10 for a valve member 11. The upper housing portion 2 has a main chamber 12 and a auxiliary chamber 13 communicating with each other through a connecting passage 14. The main chamber is shaped to define a seat 15 for the valve member 11 which is a continuation of seat 10. A connecting passage 16, having a smaller diameter than connecting passage 14, has the purpose of establishing a communicating between the admission chamber 5 in the lower housing portion 1 and the main chamber 12 in the upper housing portion 2. A connecting passage 17 is also formed in the upper housing portion 2, axially aligned with the connecting passage 16, in order to allow for the inspection and cleaning of the connecting passage 16. A cover 18 is used to close the connecting passage 17.

A diaphragm 19, solidary to of one piece with said valve member 11 and fixed between the lower and upper housing portions 1, 2 acts to avoid the fluid in the admission chamber 5 of the lower housing portion 1 entering the main chamber 12 of the upper housing portion 2. A spring 20 in the main chamber 12 is used to maintain the closed condition of the valve, with the valve member 11 abutting the seats 10, 15. The driving chamber 3, having the solenoid 4 to control the opening and closing of the valve mounted therein, is mounted by matching screws in the auxiliary chamber 13 of the upper housing portion 2. A diaphragm 21 is used to avoid that the fluid to be controlled enter the driving chamber 3, which is filled with a suitable fluid such as a lubricating oil. The solenoid 4 is of a conventional type and has a core 22 with a coil 23 wound around the core. The ends of the coil project to the outside of the driving chamber 3 to define contacting poles 24. A shaft or needle 25 solidary to (of one-piece with) the core 22 extends to the interior of the auxiliary chamber 13. The shaft or needle has an end 26 that seats against a valve seat 27 in the edge of a connecting passage 28 communicating the auxiliary chamber 13 with the discharge chamber 6 of the valve. A spring 29 serves to maintain the needle-shaped end 26 against the seat 27 in order to close the valve.

The operation of the flow rate control valve for use with fluids having suspended particles according to the present invention is quite simple and will be described in greater detail hereinafter.

In the closed position of the valve, the spring 20 bias the closing member 11 against the seats 10, 15 and the spring 29 bias the needle-shaped end 26 against its seat 27 in the edge of the connecting passage 28, as shown in FIG. 1. This way, all fluid passages from the admission chamber 5 to the discharge chamber 6 are closed and the passage of fluid in interrupted. Additionally, when the pressure P in admission chamber 5 goes up, the connecting passage 16 transfers the increase in the pressure to the main chamber 12 in the upper housing portion 3 and, accordingly, to the auxiliary chamber 13, through said connecting passage 14. This balances the pressures within the flow rate control valve, and helps maintain the closed condition of the valve, because in addition to the spring 20, the valve member 11 also receives the pressure P in the main chamber 12. This way, driving chamber 3 is also pressurized, because while the diaphragm 21 does not allow the passage of fluid to the interior of the chamber, it receives the pressure within the auxiliary chamber 13 and transfer it to the oil within the driving chamber.

In order to open the flow rate controlling valve according to the present invention to allow the passage of fluid from the admission chamber 5 to the discharge chamber 6, initially the coil 23 is activated by the application of a voltage between its poles 24 to activate the solenoid 4. The activation of the coil causes a displacement of the core 22 against the force of the spring 29, driving the needle-shaped end 26 away from its seat 27 in the connecting passage of fluid there through. This opening unbalances the pressures within the valve, whereby the pressure $P_1$ in the main chamber 12 and in the auxiliary chamber 13 becomes smaller than the pressure P within the admission chamber 5. The pressure in the admission chamber 5 forces the valve member 11 away from its seats 10, 15 and, without the additional force of the pressure P within the main chamber 12, the force of the spring 20 is not sufficient to maintain the valve member 11 against its seats 10, 15. Thereby the valve is opened to allow the passage of fluid from the admission chamber 5 to the discharge chamber 6.

To close the flow rate controlling valve according to the present invention it is only necessary to re-active the solenoid 4. This way, spring 29 forces the needle-shaped end 26 against its seat 27, interrupting the passage of fluid through said connecting passage 28. This returns the pressures in the several chambers of the valve to the initial balanced condition. Thereby the pressure P within the main chamber 12 and the force of the spring 20 force the valve member 11 against its seat 10, 15, closing the valve and interrupting the passage of fluid from the admission chamber 5 to the discharge chamber 6.

This new arrangement of parts of the flow rate control valve according to the present invention allows the most sensitive component of the valve, that is, the solenoid, to operate in an environment completely free of particles and/or any contaminating agents that eventually may be present in the fluid to be controlled, therefore solving one of the biggest problems of the flow rate control valves of this type known in the state of the art. Also, this new arrangement of parts can considerably raise the useful life of the flow rate control valve according to the present invention, additionally reducing the serious operational problems of the valve due to the buildup of debris in the valve seat. Additionally, the use of an oil to fill the driving chamber in order to allow the balance of the pressures within the valve, allows the solenoid to move freely, under constant lubrication, thereby eliminating any possibility of jamming of the valve. The valve can operate with normal low, medium and high pressures used in agricultural practices.

It will be understood that each of the elements described above, or two or more together, may also find a useful application in other types of constructions differing from the types described above.

While the invention has been illustrated and described as embodied in Flow rate control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A flow rate control valve for controlling a rate of flow of a fluid with suspended particles, comprising a first housing portion having an admission chamber and a discharge chamber separated from one another and a first seat; a second housing portion having a main chamber and an auxiliary chamber in fluid communication with one another; passage means providing fluid communication of said main chamber with aid auxiliary chamber, said main chamber with said admission chamber, and said auxiliary chamber with said discharge chamber; a valve member selectively movable between a first position to a closed position of the valve and abutting against said first seat to interrupt a passage of fluid from said admission chamber to said discharge chamber, and a second position corresponding to an open position of the valve to allow a passage of fluid from said admission chamber to said discharge chamber, driving means for controlling opening and closing of the valve and including a second seat provided between said auxiliary chamber and said discharge chamber, a driving chamber insulated from said auxiliary chamber so that the fluid cannot enter said driving chamber, and a driving element movable in said insulated driving chamber, said driving element being spring-biased against said second seat for balancing pressures within the valve and helping to maintain a closed condition of the valve, said driving element being activated to withdraw from said second seat and allow passage of fluid between said auxiliary chamber and said discharge chamber when the pressures within the valve are unbalanced and a pressure inaid admission chamber forces said main chamber and said auxiliary chamber, a second connecting passage which communicates said main chamber and said admission chamber, and a third connecting passage which communicates said auxiliary chamber with said discharge chamber.

2. A flow rate control valve as defined in claim 1, wherein said housing portions are arranged one above the other so that said first housing portion is formed as a lower housing portion while said second housing portion is formed as an upper housing portion.

3. A flow rate control valve as defined in claim 1, wherein said first housing portion has a wall member which separates said admission chamber from said discharge chamber and has an upper end defining said first seat.

4. A flow rate control valve as defined in claim 1, wherein said passage means include a first connecting passage which communicates said main chamber and said auxiliary chamber, a second connecting passage which communicates said main chamber and said admission chamber, and a third connecting passage which communicates said auxiliary chamber with said discharge chamber.

5. A flow rate control valve as defined in claim 4, wherein said third connecting passage has an upper edge provided with said second valve seat, said driving element including a spring-biased operated shaft having a needle-shaped end bearing against said second seat, and a spring biasing said needle-shaped end against said second seat, said driving means being activated so as to withdraw said needle-shaped end from said second seat in said third connecting passage to allow the passage of fluid through said third connecting passage.

6. A flow rate control valve as defined in claim 1, wherein each of said admission and discharge chambers has an inner screw for connecting to an outside element.

7. A flow rate control valve as defined in claim 1; and further comprising means for spring-biasing said valve member to said first position corresponding to the closed condition of the valve.

8. A flow rate control valve as defined in claim 1; and further comprising means for interrupting communication between said admission chamber and said main chamber and including a diaphragm mounted between said housing portions.

9. A flow rate control valve as defined in claim 8, wherein said diaphragm is formed of one piece with said valve member.

10. A flow rate control valve as defined in claim 1; and further comprising means for insulating said driving chamber from said auxiliary chamber.

11. A flow rate control valve as defined in claim 10, herein said means for insulating said driving chamber from said auxiliary chamber is formed as a diaphgram.

12. A flow rate control valve as defined in claim 11, wherein said diaphragm is connected with said driving element.

13. A flow rate control valve as defined in claim 12, wherein said driving chamber has an immovable wall, said diaphragm having an outer edge connected with said immovable wall and an inner edge connected with said driving element.

14. A flow rate control valve as defined in claim 13; and further comprising a further housing portion which includes said wall and limits said driving chamber, said diaphragm being clamped between said further housing portion and said second housing portion.

* * * * *